Dec. 28, 1965  C. J. LA BELLE  3,225,905
RECIPROCATING INTERFINGERED CONVEYORS
Filed Sept. 13, 1963  2 Sheets-Sheet 1

INVENTOR.
CLAYTON J. LaBELLE
BY
Adolph G. Martin
ATTORNEY

Dec. 28, 1965          C. J. LA BELLE          3,225,905
RECIPROCATING INTERFINGERED CONVEYORS
Filed Sept. 13, 1963                     2 Sheets-Sheet 2
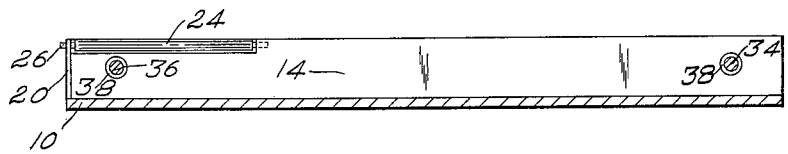
Fig-5-
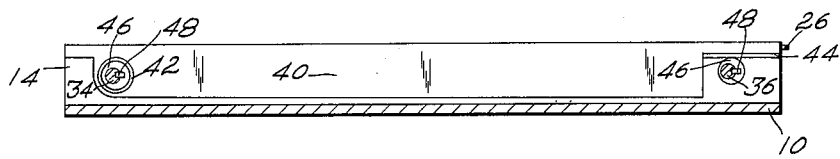
Fig-6-
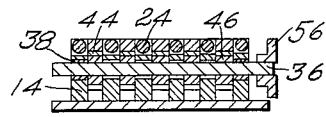
Fig-7-
INVENTOR.
CLAYTON J. LA BELLE
BY
Adolph G. Martin
ATTORNEY

United States Patent Office 3,225,905
Patented Dec. 28, 1965

3,225,905
RECIPROCATING INTERFINGERED CONVEYORS
Clayton J. La Belle, 142 Charles St.,
River Rouge 18, Mich.
Filed Sept. 13, 1963, Ser. No. 308,773
2 Claims. (Cl. 198—219)

This invention relates to transfer mechanisms generally, and more particularly to a type of portable conveyor adapted for use in loading and unloading freight and cargo, and moving it in warehouses and storage depots.

The transportation industry has long recognized that the handling of freight and cargo is strenuous, time consuming and at times extremely hazardous work. This situation is due in large measure to the considerable amount of physical labor required by present practices. Cognizant of this situation, the applicant has, as the primary object of his invention, the provision of a compact and conveniently portable conveyor section which can be readily coupled to provide a device for handling freight and cargo which is safe and relatively easy to operate.

Another object of the invention is the provision of a device of the type previously described, which facilitates the handling of a large volume of freight and cargo with relatively little personnel.

A further object of the invention is to provide a device of the type previously described, which is light in weight, strongly constructed and has few operating components.

Other features and advantages of the invention will become apparent after consideration of a detailed discussion of the same composed with reference to the drawings constituting a portion of this application, and in which:

FIGURE 5 is a section view taken substantially on plane 5—5 in FIGURE 3, showing the transverse shafts and the support bearings mounted in the elongated stationary members of the conveyor.

FIGURE 6 is a section view taken substantially on plane 6—6 in FIGURE 4, showing the keys locking the cams on the transverse shafts.

FIGURE 7 is a section view taken substantially on plane 7—7 in FIGURE 2 showing the flat bearings on the elongated movable members of the conveyor.

Figure 1:
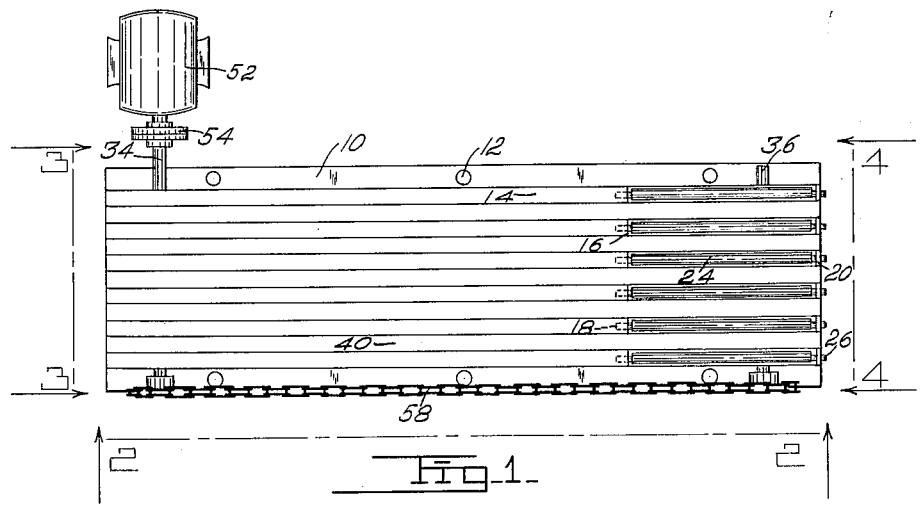
FIGURE 1 is a plan view of the applicant's invention, showing the driving mechanism, and the rollers on the stationary members of the conveyor.

For a more detailed description of the invention, reference is made to the drawings in which numeral 10 designates a flat base having along each side thereof, spaced openings 12 for the reception of anchor bolts not here shown. A series of spaced elongated stationary members 14, permanently mounted on the base 10, are reduced in cross section on the forward end to provide a vertical shoulder 16 having therein a socket 18. An upright plate 20 on the end of each stationary member 14 has a hole 22 therethrough longitudinally aligned with the socket 18 in the vertical shoulder 16.

A longitudinally disposed roller 24, provided with end pintles 26, is mounted for rotation on the forward portion of each elongated stationary member 14. The end pintles 26 on the rollers 24 are supported in the sockets 18 and the holes 22 in the upright plates 20 so that the upper periphery thereon substantially coincides with the plane of the top surface on the elongated stationary members 14. A coupling strap 28, having therein a pair of spaced openings 30, is connected adjacent the end of each outer elongated stationary member 14, by means of a bolt 32, or other suitable means.

A pair of transverse shafts 34 and 36 are rotatably supported in the bearings 38 mounted in the elongated stationary members 14. Elongated movable members 40, disposed between the spaced elongated stationary members 14, are reduced in cross section on each end thereof, for reasons which will appear later. A tubular bearing 42 is mounted adjacent the rear end of each elongated movable member 40, and a downwardly disposed flat bearing 44 is provided on the forward end of each such member 40. Spaced cams 46, disposed in the tubular bearings 42, are mounted on each of the transverse shafts 34 and 36 intermediate the stationary members 14, and removably secured thereon by means of keys 48.

The cams 46, on the transverse shaft 36, are in sliding engagement with the downwardly disposed flat bearings 44 on the elongated movable members 40. A reversible electric motor 52, or other suitable source of power, is detachably connected to one of the transverse shafts 34 by means of a coupling 54. A sprocket 56 is mounted on each of the transverse shafts 34 and 36, and connected together by means of an endless link chain 58.

The preceding discussion completes a description of the structural details of the applicant's invention as herein disclosed; however, to insure a more thorough appreciation and understanding of the subject matter presented, a brief discussion will be directed to the manner in which the invention operates in performing its intended function.

Figure 2:
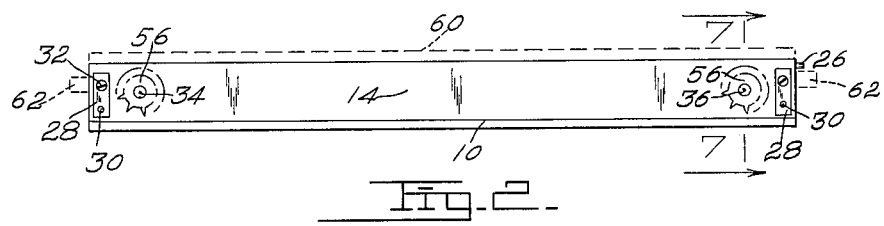
FIGURE 2 is an elevation view taken substantially on plane 2—2 in FIGURE 1, with the link chain removed so as to show the drive sprockets.
Figure 4:
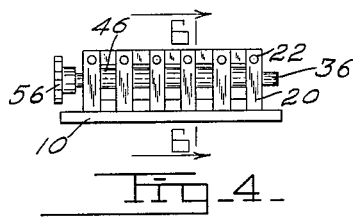
FIGURE 4 is an elevation view taken substantially on plane 4—4 in FIGURE 1, showing the end plates on the elongated stationary members of the conveyor, supporting the pintles of the rollers.
Figure 3:
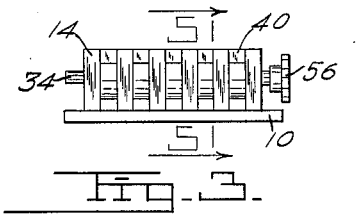
FIGURE 3 is an elevation view taken substantially on plane 3—3 in FIGURE 1 showing end construction of the elongated members of the conveyor.

In operation, the electric motor 52 when energized, drives the transverse shaft 34, which transmits driving effort through the link chain 58 to the other transverse shaft 36. As the transverse shafts 34 and 36 are rotated, they drive their respective cams 46 in a clockwise or counterclockwise direction depending upon the direction in which the electric motor 52 is rotating. A clockwise rotation of the cams 46 elevates the elongated movable members 40 above the upper surface of the stationary members 14 to the broken line position 60, shown in FIGURE 2.

Simultaneously, therewith, rotation of the cams 46 on the transverse shafts 34 and 36, also shifts the elongated movable members 40 in a forward direction relative to the stationary members 14. Any load on the conveyor is thus moved toward the rollers 24 on the elongated stationary members 14, a fixed distance upon every complete revolution of the cams 46. When the load has thus been shifted so that it is being supported entirely on the rollers 24, it can be readily removed from the conveyor by the application thereto of a transverse force of sufficient magnitude.

A load can likewise be conveniently placed on the conveyor by means of the rollers 24. A counterclockwise rotation of the cams 46, will thereupon move the load toward the rear of the conveyor in the manner previously described. In practice, it is possible to build up a conveyor of any desired length by connecting together a series of the individual sections shown in FIGURE 1. This is done by butting together the individual sections, and moving the coupling straps 28 to the broken line position 62 shown in FIGURE 2 where they are attached to the added sections by screws or bolts not here shown.

When two or more individual conveyor sections are connected together as previously described, it is necessary to attach sprockets on each end of the two transverse shafts 34 and 36 of the added sections, so that link chains 58 can be employed to transmit driving effort from the electric motor 52 to the drive cams 46.

Based upon the foregoing discussion, the applicant is of the opinion that his invention has fulfilled a long-felt need in the field of conveyors, and that he has accordingly made a valuable contribution to the related art. However, while the invention was described with reference to the structural details of a single embodiment, it will be appreciated by those familiar with the art that the principles involved are susceptible of numerous other practical adaptations.

Therefore, I claim as new and desire to secure by Letters Patent:

1. A base, a series of spaced elongated stationary members supported on the base, a series of movable elongated members disposed between the stationary members in an alternate arrangement, at least two transverse shafts rotatably mounted in the elongated stationary members, and cams on the transverse shafts directly supporting the series of movable elongated members.

2. A base, a series of spaced elongated stationary members supported on the base, a series of elongated movable members disposed between the elongated stationary members in an alternate arrangement, a first transverse shaft extending through both the stationary and movable members rotatably supported in the stationary members, spaced cams on the first transverse shaft rotatably engaged in one end of the elongated movable members, a laterally disposed bearing surface on the other end of each elongated movable member, a second transverse shaft rotatably supported in the stationary members, and spaced cams on the second transverse shaft slidably engaging the bearing surfaces on the elongated movable members.

References Cited by the Examiner

UNITED STATES PATENTS

| | | | |
|---|---|---|---|
| 894,424 | 7/1908 | Converse | 198—219 |
| 1,343,373 | 6/1920 | Pedersen | 198—219 |
| 1,824,429 | 9/1931 | McKee | 198—219 |
| 1,842,890 | 1/1932 | Williams | 198—219 |

SAMUEL F. COLEMAN, *Primary Examiner.*

WILLIAM B. LABORDE, *Examiner.*

R. E. KRISHER, *Assistant Examiner.*